United States Patent

Basham et al.

[11] Patent Number: 5,969,893
[45] Date of Patent: *Oct. 19, 1999

[54] TAPE PRE-FORMATTING WITH UNIFORM DATA STORAGE SEGMENTS SELECTIVELY MAPPED TO FIXED OR VARIABLE SIZED INDEPENDENTLY ADDRESSABLE DATA STORAGE PARTITIONS

[75] Inventors: Robert Beverley Basham; Kirby Grant Dahman; Scott Milton Fry; Steven Douglas Johnson; Steven Bennett Wilson, all of Tucson, Ariz.

[73] Assignee: International Business Machines Corporation, Armonk, N.Y.

[*] Notice: This patent is subject to a terminal disclaimer.

[21] Appl. No.: 08/899,042

[22] Filed: Jul. 23, 1997

Related U.S. Application Data

[62] Division of application No. 08/614,126, Mar. 12, 1996, abandoned.

[51] Int. Cl.⁶ ........................................... G11B 5/09
[52] U.S. Cl. ..................... 360/49; 360/48; 360/72.2
[58] Field of Search .................... 711/4, 111; 360/48, 360/49, 72.1, 72.2, 77.12

[56] References Cited

U.S. PATENT DOCUMENTS

| | | |
|---|---|---|
| 2,670,212 | 2/1954 | Heller et al. . |
| 4,422,111 | 12/1983 | Moeller et al. . |
| 5,373,485 | 12/1994 | Hogan et al. . |
| 5,546,246 | 8/1996 | Klomp et al. . |
| 5,572,378 | 11/1996 | Schwarz et al. ........................ 360/48 |
| 5,592,342 | 1/1997 | Hall et al. . |
| 5,757,571 | 5/1998 | Basham et al. ........................ 360/72.1 |

*Primary Examiner*—Alan Faber
*Attorney, Agent, or Firm*—Gray Cary Ware Freidenrich

[57] ABSTRACT

Various data storage formats help to efficiently locate, read, and write user data stored on magnetic tape media. A tape is formatted by writing multiple segment-headers, free from any interleaved access of user data Adjacent segment-headers are spaced by a predetermined interval to define multiple data storage segments. Segment-headers all contain a unique key, which is copied into a key index to identify valid segments. After formatting, normal tape accesses can be performed. Without erasing any old headers or data, a new formatting scheme can be established by writing new segment-headers on the tape. The new segment-headers include a new unique key, replacing the previous key in the key index. Previous segment-headers stored on the tape are ignored, since they lack the updated key. Segments may be selectively grouped to provide independently addressable partitions. Mapping between segments and partitions can use a fixed relationship (e.g. one-to-one), or each partition may be variably sized according to the amount of data to be stored therein. Variable-sized partitions may be automatically padded with a selected number of empty segments. Another feature is flexible-capacity scaling, which distributes an ordered set of device blocks on a multi-track magnetic tape medium. The device blocks are bi-directionally stored in a continuous configuration of multiple adjacent stacked serpentine patterns occupying some or all of the tape. This configuration permits sequential access of all device blocks without advancing the tape medium to skip over regions between adjacent device blocks.

25 Claims, 8 Drawing Sheets

TAPE PRE-FORMATTING WITH UNIFORM DATA STORAGE SEGMENTS SELECTIVELY MAPPED TO FIXED OR VARIABLE SIZED INDEPENDENTLY ADDRESSABLE DATA STORAGE PARTITIONS

This application is a division of application Ser. No. 08/614,126, filed Mar. 12, 1996, now abandoned.

BACKGROUND OF THE INVENTION

1. Field of the Invention

The present invention generally relates to the use of magnetic tape media to store data. More particularly, this invention involves various methods and apparatuses employing novel data storage formats to more efficiently and conveniently locate, read, write, and update data stored on magnetic tape media.

2. Description of the Related Art

Partitioning

A few magnetic tape storage systems with limited partitioning are known. "Partitioning" generally involves the establishment of at least one independently addressable data storage region on the tape. One known "two-partition system" uses one partition to store a directory, and another partition to store data. In contrast, a known "stacking" partition system uses multiple partitions, where each partition stores a different set of data. In the stacking partition system, new partitions are sequentially defined and appended to the existing partitions, in effect "stacking" them onto existing data.

Although these partition systems may be adequate for a number of different uses, they may not meet the requirements of certain other applications. Many applications, for example, would benefit by storing data on tape in multiple-fixed sized partitions having regularly spaced positions on tape. Theoretically, having such partitions would enable faster tape positioning, increase data capacity, and permit certain advanced functions such as updating stored data ("update in place"). However, the known partitioning systems do not support multiple, fixed sized, regularly spaced data storage partitions. The two-partition system only uses two partitions where data is only stored in one partition. With the stacking partition system, multiple data storage partitions are used, but the partitions are not fixed in size, and they are not stored in regularly spaced locations. In contrast, the size of each partition depends upon the amount of data to be stored, and the position of each partition depends upon the aggregate size of all preceding partitions.

Serpentine Data Paths & Fixed-Capacity Scaling

Many known tape storage systems store data in "serpentine" fashion, as shown in FIG. 1. Serpentine data storage patterns are one way of storing data on a tape having multiple parallel tracks. With serpentine storage, a set of device blocks are stored in a pattern that bi-directionally traverses the tape's length along different parallel tape tracks. In particular, the data storage path first spans the tape's entire length in one direction along a first track, returns in the opposite direction along an adjacent parallel track, and then continues sweeping back and forth along the tape.

To improve the access time of serpentine-stored data, engineers have developed "fixed-capacity scaling". Fixed-capacity scaling can be employed when the data does not completely fill the tape. In this case, rather than storing the data on several tracks or track groups sweeping the entire length of the tape, the data is congregated on all tracks near the beginning of the tape. In many systems, a multi-track R/W head can read sixteen tracks simultaneously, and the tape is configured into eight groups of sixteen tracks. In such a system, data stored with normal serpentine storage might occupy the entire length of four track groups, leaving the remaining four track groups unoccupied. In a tape 100 using fixed-capacity scaling, however, the data is congregated onto the first halves of all eight track groups 102 as shown in FIG. 1. To follow this data storage path, the tape is advanced such that the R/W head passes over half of the tape's length along a path 104. After "vertically" aligning the R/W head with the path 106, the tape is advanced such that the tape head returns in the opposite direction along an adjacent parallel path 106; the R/W head and tape are cooperatively moved to follow a data path that continues sweeping back and forth along the tape. As an example, the "vertical alignment" between the R/W head and the path 106 may involve physical movement of the R/W head (called "head indexing"), or switching to a different R/W head configured to operate in an opposite direction than the original R/W head. Although the data still occupies the same size region of tape, it is congregated near the beginning of the tape, leaving the last half 108 of the tape blank. As a result, tape head movement is advantageously restricted to the first half of the tape. Fixed-capacity scaling thus offers benefits in efficiently locating data, since the same data can be searched with less tape movement. With fixed-capacity scaling, time consuming tape advancement operations are avoided in favor of small, relatively rapid operations to "vertically" align the tape head and data path (e.g. head indexing or switching to a different tape head).

Although fixed-capacity scaling may be satisfactory in some cases, there are applications for which this approach is not completely adequate. For example, some cost- or efficiency-conscious users may not be willing to sacrifice a significant amount of tape storage capacity 108 in favor of faster tape access. Also, fixed-capacity scaling is inadequate for storage of data that is large enough to occupy the entire tape. In this case, fixed-capacity scaling offers no benefit since the data cannot be rearranged to fit on a smaller length of tape. In a different respect, other users may find fixed-capacity scaling to be lacking because it does not provide any type of partitioning.

SUMMARY OF THE INVENTION

Broadly, the present invention involves various methods and apparatuses employing novel data storage formats to more efficiently and conveniently locate, read, write, and update data stored on magnetic tape media. One feature of the invention is a method for pre-formatting magnetic tape media. First, multiple data storage segments are defined on a magnetic tape medium by writing a corresponding number of segment-headers to the tape medium. The storage segments are initially defined prior to using the tape, before any writing of data thereto. Adjacent segment-headers are evenly spaced apart by a first predetermined interval. This interval may be determined, for example, by a user specifying a unit of granularity. Each one of the segment-headers contains a first predetermined key common to all of segment-headers. The key, which is stored in a key index, identifies these segment-headers as being valid, i.e. most recent.

After the segments are created, user data can be stored in the segments and other normal operations can be performed, e.g. locate, read, write, etc. According to the invention, a completely different segmenting scheme can easily be established at any time, thereby invalidating previous segments and user data stored therein. Namely, a second group of storage segments are defined on the tape by writing corresponding segment-headers to the tape. The second segment-headers are evenly spaced apart by a predetermined interval, which may be different than the previous interval. Like the first spacing interval, the second interval may be specified by a user's specification of a desired level of granularity. Writing the segment-headers is preferably performed without any intervening read or write operations, ensuring that the segment-headers are evenly spaced and precisely positioned.

Each segment-header in the second group includes a key that is different than the key of the first group of segment-headers. Keys may comprise, for example, a number that is incremented each time formatting is performed. The second key, like the first, is stored in the key index, identifying the second segment-headers (containing the second key) as being valid. Having defined the second segment-headers, the first segment-headers stored on the tape are now ignored during normal tape operations, since they do not include the proper key. The first segment-headers may still be used, however, in data recovery, reconstruction, or other procedures that utilize old user data.

Segments may be grouped as desired to create independently addressable storage partitions on tape. Mapping between segments and storage partitions may be one-to-one, for example. Alternatively, another fixed relationship between segments and partitions may be used, such as a different grouping of adjacent segments to form partitions.

As another alternative, instead of using a fixed mapping between segments and partitions, variable-sized partitions may be used, each including one or more data storage segments. With variable-sized partitions, the data storage segments are first defined on tape as described above. For explanatory purposes, segments may be considered to be sequentially ordered according to their respective distances from the tape's beginning, segments nearer the beginning being ordered "earlier" than segments relatively farther from the tape's beginning. When a set of device blocks or other user data is received for storage to the tape, the blocks are sequentially written to the minimum number of contiguous data storage segments required to store the blocks. If desired, each set of device blocks may be stored beginning in the earliest-ordered segment available on the tape. Having written a set of device blocks to the minimum number of segments, these segments are defined as a partition; this is called "closing out" the partition. All remaining (i.e., unoccupied) segments are then defined as a partition. After the first partition is closed out, for example, all remaining segments are defined as the second partition.

When more device blocks are received for storage to the tape, they are written to one or more segments at the beginning of the second partition. A minimum number of segments is preferably used, as needed to store the data. Having written the new data, the second partition is "closed out" by defining the occupied segments as the second partition. All remaining (i.e., unoccupied) segments are defined as the third partition. Until the tape is filled, future data may be stored by creating additional partitions as described above, each partition having a variable size appropriate to the amount of data stored therein.

If desired, a partition may even be distributed among non-contiguous data storage segments. This may be accomplished by preparing variable partitions as described above, and then maintaining a free pool of unoccupied segments for selective association with existing partitions. The free pool also receives segments deallocated from existing partitions.

Another embodiment of the invention employs "automated padding", which is especially useful to support updating of data in variable sized partitions. In particular, updating data on tape presents special problems since updated data may occupy more space than the original data Even if the updated data contains the same number of bytes as the original data, the updated data may actually occupy more space when actually stored on tape due to variations introduced by error checking algorithms, variations in the compactibility/compressibility of data, etc. To combat this problem, automated padding works by adding one or more empty data storage segments to each partition when that partition is closed out. The number of additional segments may be selected by a user based upon the characteristics of the data in that partition. Alternatively, the number of additional segments may be automatically selected according to a default value, specified in advance by the user.

Another feature of the invention is "flexible-capacity scaling", a technique for more efficiently storing data on magnetic tape to provide faster data access. With this technique, an ordered set of device blocks is distributed on a magnetic tape medium having multiple parallel tracks. The device blocks are bi-directionally stored in a continuous configuration of multiple adjacent stacked serpentine patterns. The serpentine patterns may occupy part or all of the tape. The patterns are configured such that sequential access of all device blocks is possible without advancing the tape medium to skip over any regions intervening between adjacent ones of the ordered device blocks. Thus, the entire sequence of device blocks can be accessed with complete continuity; minimal forwarding or rewinding of the tape is needed to advance from one device block to another.

In addition to processes such as those described above, the invention also contemplates other aspects, such as various hardware apparatuses that are embodied by, produced by, or otherwise related to these methods. For example, the invention includes a tape drive embodied in data storage apparatus and a magnetic tape medium embodied in an article of manufacture.

The present invention provides a number of distinct advantages. For example, pre-formatting a tape ensures that the tape is accurately divided into a desired number of equal sized data storage segments. Unlike the prior art, these features advantageously provide the basis for faster access operations, semi-random access of data, update-in-place, and other advanced tape functions.

Additionally, the invention advantageously provides independently addressable data storage regions through the use of fixed-size partitions. Moreover, by using variable sized partitions the invention can adapt a pre-formatted tape for user data having storage of sets of varying sizes. Using variable sized partitions also permits the non-contiguous storage of sets of user data, further increasing the flexibility of this storage format. Although storing user data in non-contiguous segments resembles DASD storage, it actually provides certain advantages missing from DASD because the user can specify the storage granularity and the tape drive can read and write data bi-directionally. Another benefit of the invention, selective padding, can conveniently be set by default, or it can permit the user to flexibly select the amount of padding in response to the requirements of the application, thereby boosting data storage efficiency.

Another benefit of the invention is its flexible-capacity scaling feature, which significantly increases data locate performance for ordered data, since user data is congregated in the adjacent stacked serpentine patterns rather than being distributed across the entire tape. Unlike prior arrangements, data access is improved without having to sacrifice storage capacity by designating certain empty regions of tape. Moreover, this is achieved while still maintaining the benefit of compactly storing data in the case of partially filled tapes.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Environment
Data Storage System, Generally

Figure 1:
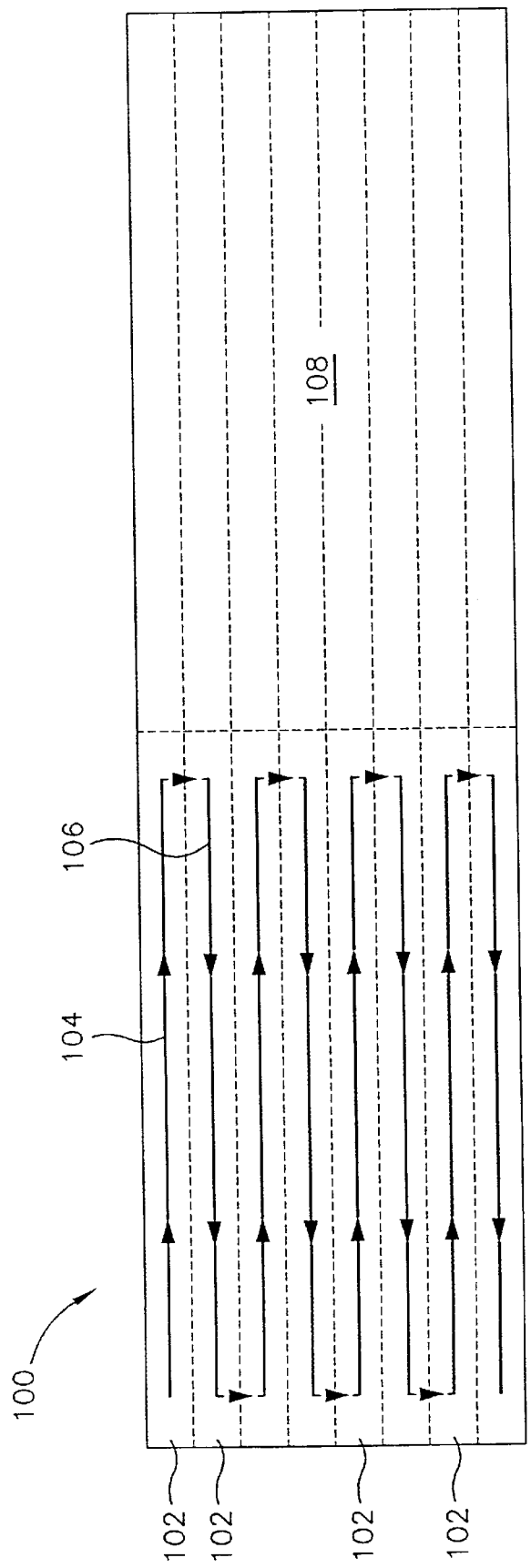
FIG. 1 is a diagram of a multi-track tape using fixed-capacity scaling.
Figure 2:
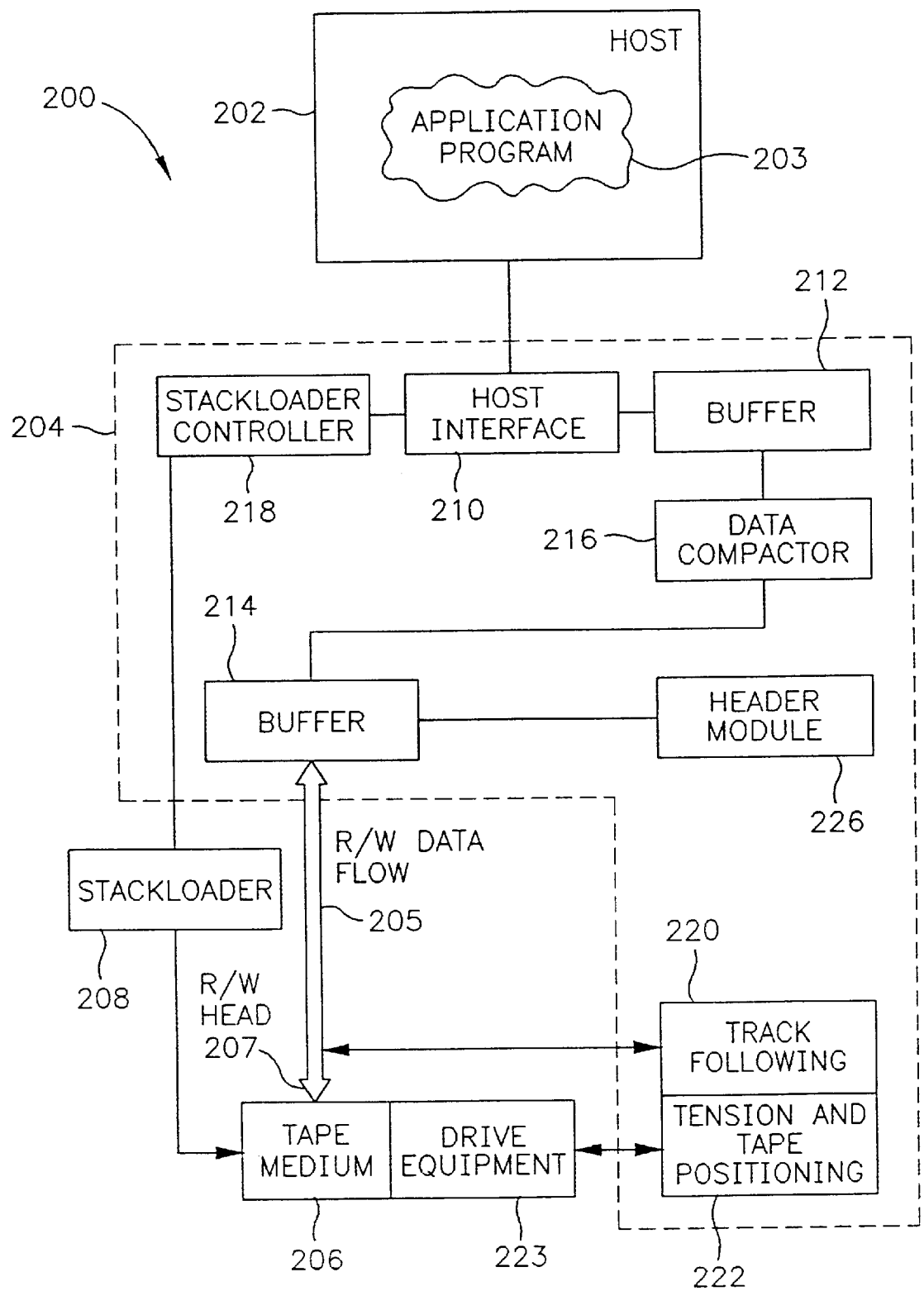
FIG. 2 is a diagram of the hardware components and interconnections of a data storage system in accordance with the invention.

The present invention may be implemented using a number of different hardware configurations, as exemplified by the tape-based data storage system 200 (FIG. 2). Generally, the system 200 includes a host 202, an R/W controller 204, a tape medium 206, and other equipment. The host 202 generates and/or maintains user data, which is stored on the tape medium 206. The "user" may comprise the host 202, a computer connected to the host through a network or other link, an application program, a control program, an operator interacting with the system 200 through a console, etc.

The controller 204 manages the exchange of user data between the tape medium 206 and the host 202. The controller 204 also handles other tasks associated with storage and retrieval of user data, such as formatting, error checking, compaction, and other tasks that may be advantageously invisible to the host 202. The controller 204 includes a number of different components, which are described more completely below. Generally, the controller 204 interacts with an R/W data flow 205 and a R/W head 207 to exchange data with the tape medium 206.

As an example, various components of FIG. 2 may be provided by components of an IBM model 3590 tape storage drive.

Tape Media

In the illustrated example, the tape medium 206 is embodied in a magnetic data storage medium such as an IBM model 3590 cartridge. The basic components of such a cartridge (see FIG. 3) include an outer shell 300, a tape reel 302, and a leader block 304. In this embodiment, the tape reel 302 is 0.5 inch wide, 1000 feet long, and has the capacity to store ten Gb of un-compacted data. The tape reel 302 contains 128 tracks and three servo tracks. The tape reel 302 may also be referred to simply as a "tape".

Tape Management Equipment

Referring to FIG. 2, the system 200 includes a number of components to cooperatively manage the tape medium 206 and the R/W head 207. Drive equipment 223 is provided to spool, forward, and rewind the tape. The drive equipment 223 includes various components (not shown) such as a tape path, tape drive motors, tachometers, and other related equipment, which may comprise known equipment.

The stackloader 208 physically transfers tapes between the drive equipment 223 and a storage location such as a shelf, storage bin, library, or other suitable site for housing dormant tape media. The stackloader 208 may comprise an IBM 3590 type stackloader, for example.

Controller

The controller 204 includes a host interface 210 such as a Small Computer System Interface (SCSI). The controller 204 also includes a pair of speed-matching buffers 212/214, to accommodate differences in I/O speed of the host 202 and the R/W data flow 205. A data compactor 216 may also be included, to reduce the size of data stored on the tape medium 206.

A stackloader controller 218, coupled to the host interface 210 and the stackloader 208, manages operations of the stackloader 208 in accordance with requirements of the host 202.

The controller 204 also includes a header module 226, which creates headers and other non-user data and forwards this information to the buffer 214 for storage on the tape medium 206. The header module 226 also has a complementary function of interpreting header and other non-user data received from the tape medium 206 via the buffer 214.

Figure 3:
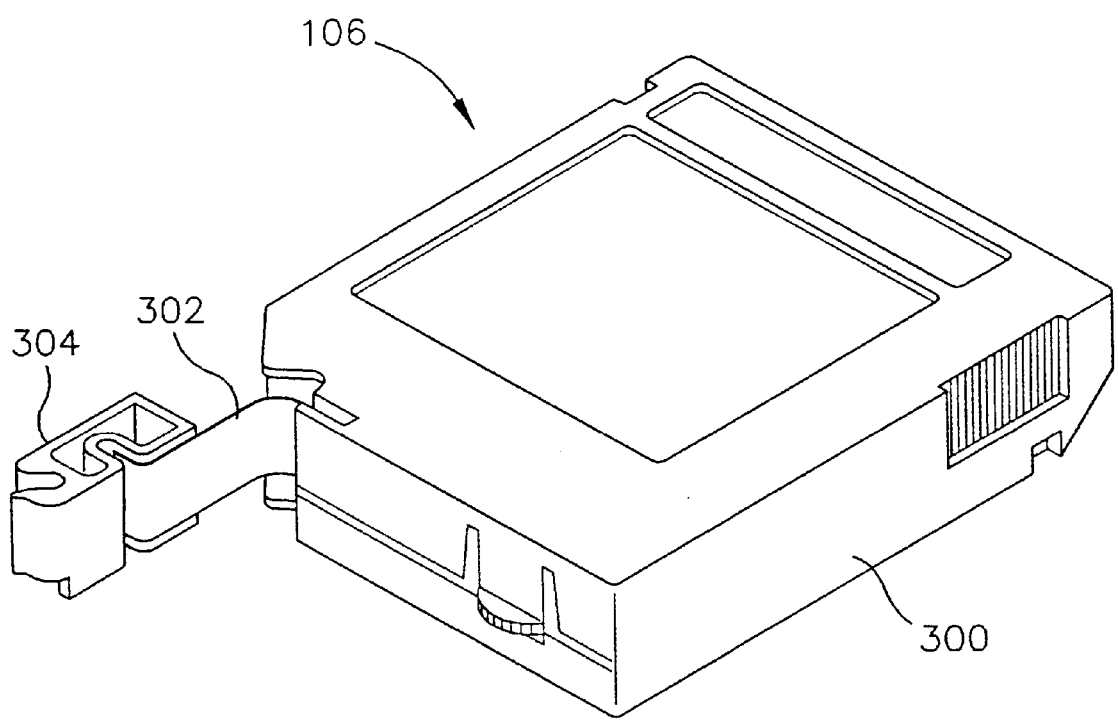
FIG. 3 is a diagram of an exemplary magnetic tape data storage medium in accordance with the invention.

Also included in the controller 204 is a track following module 220 (or "servo" module), which aligns the R/W head 207 with the desired track on the tape medium 206. The tension & tape positioning module 222 ensures that the drive equipment 223 maintains proper tension on the tape reel 302 (FIG. 3). The module 222 also manages the positioning of the tape medium 206 by controlling the operation of the motors of the drive equipment 223.

The controller 204 may, for example, be embodied in circuitry of a digital data processor such as an Intel brand i960™ microprocessor, or another suitable circuit. In one embodiment, the process steps of the invention may be implemented by executing a program of instructions, such as "C" code, using circuitry such as the controller 204, the host 202, and/or another suitable processor.

Host

In an exemplary embodiment, the host 202 may comprise an IBM personal computer, IBM model RS 6000 computer, IBM model AS 400 computer, Sun workstation, IBM 3090 mainframe computer, or another suitable data processing apparatus. As illustrated, the user data is stored and retrieved to support operations of an application program 203 being executed by the host 202. The application program 203 may comprise the ADSM program of IBM Corporation, for example. Alternatively, instead of an application program, the user data may arise from another source than the host 202, such as different host (not shown) networked to the system 200, or another hardware device, user, or process.

Pre-Formatting & Fixed-Partitioning
Storage Formats, Generally

In certain respects, data storage using tape media has traditionally offered limited benefits when compared to direct access storage devices (DASDs). The inventors have discovered, for instance, that known tape storage formats are not particularly conducive to rapidly locating data.

With known data storage formats, data is stored in a continuous data path that generally stretches from the beginning of the tape to the end of data. With multi-track tapes, data is stored in multiple parallel data paths. Usually, such data is punctuated by headers that mark the location of corresponding sub-groups of data called "device blocks" or more simply "blocks". Block sizes may vary, however, so these headers do not serve as any type of periodic marker distributed through the tape. In this respect, some tape formats include a dedicated "tachometer strip" that includes periodically distributed markings used by a tachometer to accurately position the tape. The tachometer strip is not integrated with the data, however, so a separate strip of tape is needed for this purpose.

The inventors have discovered that in tape systems not configured for tachometer strips, interspersing regularly spaced markings with the data permits more rapid access of the data. For example, by defining regularly spaced data "segments" of known sizes, a device block can be easily located by quickly advancing the tape a known distance to reach the beginning of the appropriate segment. No known storage formats exist, however, where data is stored in multiple fixed-sized data segments whose boundaries are uniformly and consistently defined. In contrast, quickly advancing to a particular device block is more difficult with the known data storage format since each device block preceding the desired block may be differently sized. As a result, it may be necessary to reach the desired block by forwarding block-by-block past previous blocks, using their headers as guideposts.

Another potential advantage of using regularly spaced data segments is the possibility of "update-in-place", where existing data may be updated on tape by writing over one or more relevant data segments.

Guardband Compounding

As discovered by the inventors, however, "guardband compounding" is a significant problem in creating fixed-size segments on tape media not equipped with tachometer strips. As mentioned above, known systems do not provide data segments with fixed and consistent boundaries. In these systems, blocks of data are stored sequentially, each block being stored immediately after its corresponding header. As more and more device blocks (and their headers) are added to the tape, the tape is eventually filled. Since these formats do not perform update-in-place, adjacent device blocks may stored without any intervening space or "guardband."

If fixed-size segments were to be created by adapting known techniques, guardband compounding would significantly reduce the tape's storage capacity. Even if each device block were to optimally occupy a fixed-sized region of tape, there may be subtle variations among the block sizes due to the temperature, tape tension, tape drive performance, and other conditions at the time of data storage. Generally, each block of data and its corresponding header might be stored at a completely different time than the other device blocks and their corresponding headers. Furthermore, when writing successive device blocks, any positioning error would be maintained from block-to-block; that is, if one data block is misaligned, the next data block will be misaligned as well. Therefore, it is possible that the 60th block, for example, may be positioned in the region that is assigned to the 61st block. In an attempt to access the 61st block, the tape drive would thus fast-forward the tape to the 61st block a distance of 61 multiplied by the standard segment length; at this location, however, the tape drive would find the 60th block, possibly creating a data read error.

Therefore, as each device block is stored in the fixed-size segment system, an empty region of tape (a "guardband") would have to be laid down following that block. Specifically, each block's guardband would provide a buffer in case that block incorrectly begins too late and extends into the next block's space. Thus, if the tape drive fast-forwards or rewinds to the predicted position of a particular block, and this position is nominally in the previous block's guardband, the tape drive would not write over the previous block's data.

The guardband would also serve to support update-in-place, since updated data may be larger than the original data, e.g. because of variations in error coding, variations in compaction techniques, the addition of more data, etc.

Each guardband would have to incorporate any possible errors in the positioning of the previous device blocks in addition to any possible errors of the device blocks of its own segment. Therefore, the guardbands would increase in size as successive device blocks are written. This is "guardband compounding." And, since each segment has a fixed-size, segments with larger guardbands would have smaller data storage capacity.

Accordingly, due to problems with guardband compounding, the inventors have developed the pre-formatting technique described below to support fixed-sized segments while substantially preserving data capacity. The inventors' pre-formatting technique also serves to significantly reduce a tape's pre-formatting time, which would otherwise be excessive for many applications.

Pre-Formatting

In particular, the inventors have developed a method for configuring magnetic tape media for more efficient data access by pre-formatting the tape media. Before storing any data, the tape is pre-formatted into a plurality of data storage segments of equal size. Advantageously, since the segments are all defined at one time, the position of each segment is more precisely controlled; this permits the sizes of the segments' guardbands to be significantly reduced.

As described in greater detail below, another advantage of pre-formatting tape media into segments is that segments may be logically organized into independently addressable storage regions called "partitions." With fixed-size partitioning, each partition includes a fixed number of one or more segments; the size of each partition may be equal, or they may vary. With variable-sized partitioning, however, each partition includes a user-selected number of partitions, which can change at certain times, such as when the tape is reformatted.

Tape Organization, Generally

Figure 4:
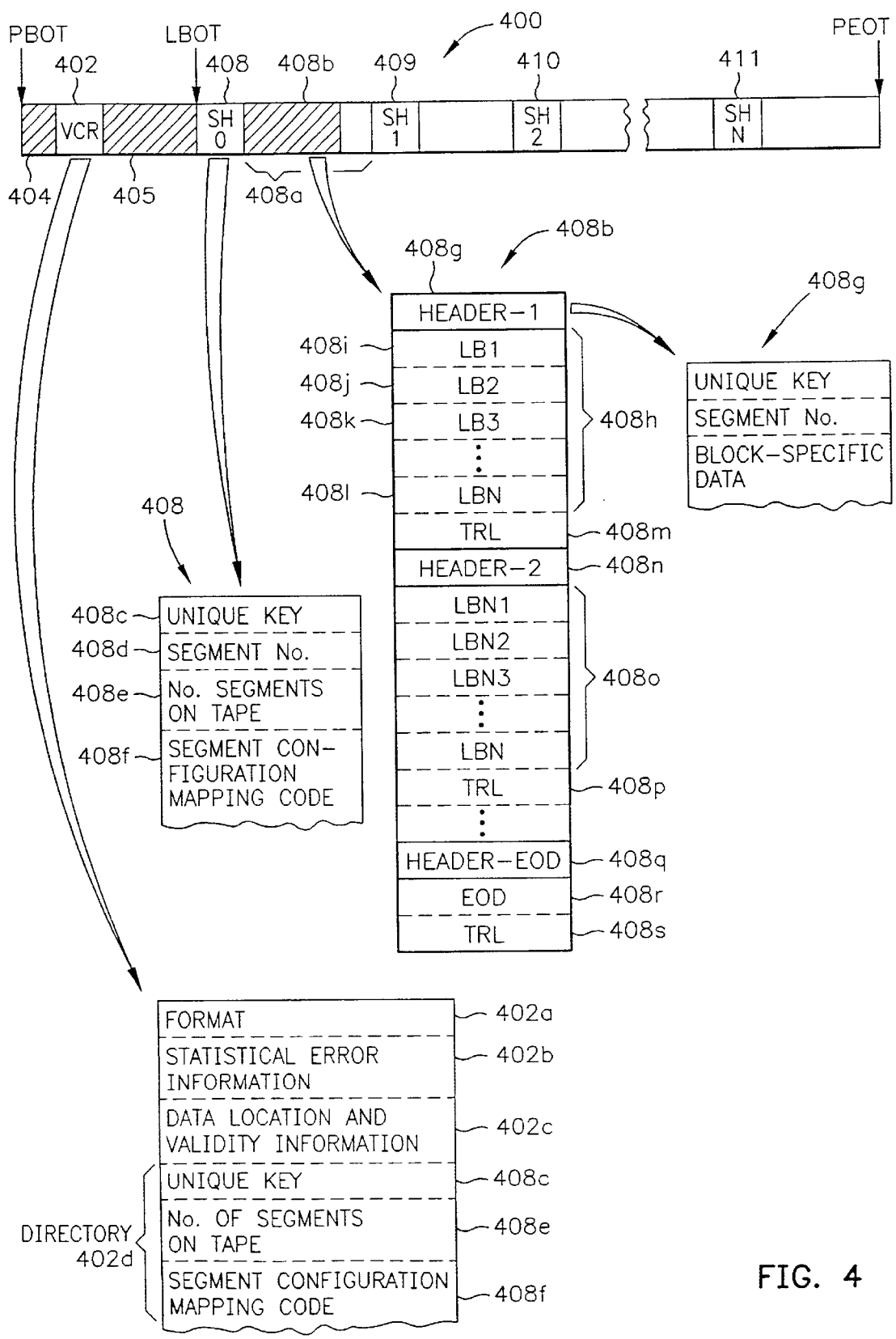
FIG. 4 is a block diagram depicting a pre-formatted tape exemplifying fixed partitioning in accordance with the invention.

Referring to FIG. 4, a tape 400 is shown to more thoroughly illustrate one example of the pre-formatting method of the invention. The tape 400 may, for example, comprise a tape reel of a cartridge as shown in FIG. 3. The tape 400 includes a physical beginning of tape (PBOT), a physical end of tape (PEOT), and a logical beginning of tape (LBOT). Prior to the LBOT lies a volume control region 402 (VCR) along with a pair of data pads 404–405.

The tape 400 also includes a plurality of segment-headers, labeled as SH-0 through SH-N (also numbered 408–411 respectively). Following each segment-header is a data storage region, such as the storage space 408a in the case of the segment-header 408. Each storage region may be occupied by number of device blocks, such as the set of device blocks 408b in the space 408a. Each segment-header and the following data storage region may be referred to as a "segment."

Segment Codes

Each segment-header includes a number of different codes. The segment-header 408, for example, includes a unique key (408c), a segment number code (408d), a code (408e) indicating the number of segments on the tape, and a segment configuration mapping code (408f). The unique key 408c comprises a combination of numeric, alphabetic, or alphanumeric characters in a predetermined format, such as a prescribed number of binary digits. The unique key 408c is similarly placed in all segment-headers, and it is unique to these segment-headers with respect to any segment-headers used in prior pre-formatting of the tape 400. The unique key 408c therefore distinguishes the segment-headers 408–411 as being the most-current (i.e., "valid") segment-headers. As described below, using unique keys significantly reduces the time required to pre-format a tape.

The segment number 408d preferably provides a number sequentially identifying the corresponding segment with respect to the other segments, e.g. SH-0 may be numbered "0". The code 408e simply lists the number of segments on the tape, i.e. the total number of segment-headers that the tape 400 has been preformatted with. The segment configuration mapping code 408f comprises a code indicative of the configuration of pre-formatting applied to the tape 400. Preferably, this code contains a number of binary digits representing a pre-determined configuration of the tape, which corresponds to a menu of recognized configurations. Each pre-determined configuration, for example, may include a combination of characteristics such as the size of each segment, the pattern in which segments are laid out on tape 400, etc. Also, the code 408f may contain a representation of the mapping between segments and fixed-size partitions, as discussed in greater detail below.

Device Blocks

As mentioned above, each segment includes a data storage region that may contain a number of device blocks. Each device block is preceded by a header and followed by a trailer. The last device block comprises a code signalling the end-of-data (EOD), i.e. the final device block in that segment.

As an example, FIG. 4 illustrates the contents of the device blocks stored in the region 408b. A header 408g precedes a device block 408h containing multiple logical blocks 408i–408l. The logical blocks 408i–408l are followed by a trailer 408m. A second device block 408o is preceded by a second header 408n and followed by a trailer 408p. Finally, an EOD device block 408r is sandwiched between a header 408q and a trailer 408s.

As shown by the expanded depiction of the header 408g, each header in the set of blocks 408b includes the unique key, the segment number, and certain data specific to the corresponding device block.

VCR

The VCR 402 includes a number of different codes, such as a format code (402a), statistical error information code (402b), a data location and validity information code (402c), and a directory (402d). The directory 402d includes a copy of the unique key (408c), the number of segments on tape (408e), and a copy of the segment configuration mapping code (408f).

The format code 402a indicates how the tape 400 is formatted, e.g. data storage density, number of data tracks, number of servo tracks, etc. The code 402b maintains a log of the types and frequency of data access errors. The code 402c provides location information for the different items of data, listing the contents of each segment and naming any areas of tape containing invalid data.

The directory 402d includes similar information as the segment-header 408, described above.

Pre-formatting Sequence

Figure 5:
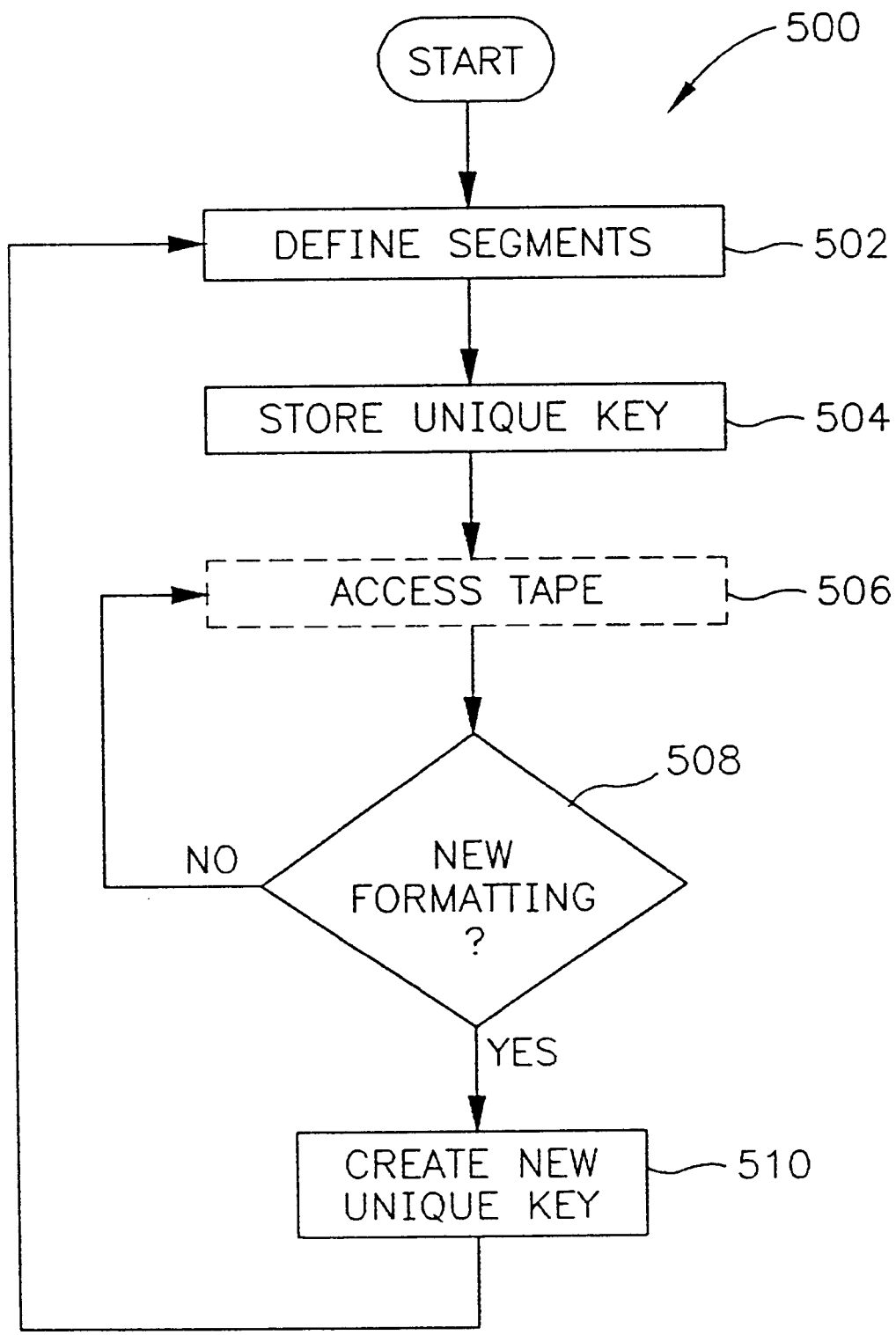
FIG. 5 is a flowchart showing a sequence for pre-formatting a tape utilizing fixed partitioning in accordance with the invention.

FIG. 5 depicts an exemplary pre-formatting sequence pursuant to the invention, beginning in task 502. The sequence 500 may be performed by using a digital data processor such as the controller 204 or the host 202 to execute a program of machine-readable instructions of "C" or another programming language. Referring to FIGS. 4–5, the tape drive is operated in task 502 to "pre-format" the tape 400 by defining the segments on the tape 400. The term "pre-formatting" is used because formatting of new segments is performed prior to their use. The segments are defined by writing the segment-headers 408–411 to the tape, each segment-header including a unique key common to all segment-headers as described above. If desired, task 502 may include a step (not shown) of receiving user input to define certain characteristics of the segments such as their "granularity", which specifies the size and/or the total number of segments.

Importantly, the segment-headers are created free from any interleaved writing of data to the tape medium. In this way, the segment-headers are created at one time, avoiding any concerns with guardband compounding. Preferably, however, a small guardband is still used in each segment's data storage region, to accommodate minute discrepancies that may exist in the precise location of each segment-header.

Preferably, the segment-headers are written in task 502 in the most efficient manner possible. For example, in the case of a multi-track tape, all "vertically aligned" segment-headers may be quickly defined at one time by repeatedly writing a segment-header, then aligning with a different track by head switching or head indexing, then writing another segment-header, etc. After all segment-headers at one vertical alignment are defined, the tape is advanced to the next point of vertical alignment.

In task 504, the VCR 402 is created, including a copy of the present unique key 408c. The copy of the unique key in the VCR 402 provides an index identifying the segment-headers of task 502 as being valid, i.e. most-recent.

In normal operation, after task 504 the drive 223 in task 506 may involve the tape in various access operations, such as read, write, and seek operations. Task 506 is preferably optional, however, since there need not be any requirement to perform tape access between successive pre-formatting operations. After task 506, query 508 asks whether a request has been received to create a new configuration of segments by re-formatting the tape. If not, control returns to task 506 to permit more tape access. If query 508 answers "yes", however, task 510 creates a new unique key. If the unique key is a sequence of binary digits (as described above), task 510 may be accomplished, for example, by incrementing the digital sequence by one or more units.

After task 510, control returns to tasks 502/504 to pre-format the tape with new segment-headers and the new unique key. At this time, further user input may be received (not shown) to define various characteristics of the segments, such as their granularity. In most cases, the new segments' granularity will differ from that of the old segments. During pre-formatting (tasks 502), the new segment-headers and VCR are simply written over the existing segment-headers and VCR. Previously-existing data not written over by the segment-headers remains on the tape, as no erasing is performed.

After the tape is pre-formatted to define new segments (tasks 502/504), the drive 223 may conduct further tape access in task 506. Such tape access operations are conducted by referencing only the segment-headers and device block headers that self-demonstrate validity by containing the latest unique key. Old data and header information is ignored. Using the unique key in this way drastically reduces time that would otherwise be required to pre-format the tape. Advantageously, however, old data and header information may still be used for reasons such as data recovery, reconstruction, or other procedures that utilize old data.

Partitioning

If desired, the sequence 500 may include further steps (not shown) to define each segment as an independently addressable fixed-size "partition," as mentioned above. In this case, the segment configuration mapping code 408f also constitutes a "partition directory", providing a directory to the address of each fixed-size partition and its contents.

In one embodiment, there may be a one-to-one mapping between partitions and segments. Alternatively, instead of using single-segment fixed partitions, an application may require assorted sizes of fixed-size partitions, each partition including one or more adjacent segments, as required by the application. For example, a tape may be defined with 64 segments allocated to three five-segment partitions and one 49-segment partition. In embodiments having partions of assorted fixed sizes, the mapping between segments and partitions may be maintained in a partition configuration mapping code 600 (FIG. 6), which is included as part of the directory 402d. As an example, partition sizes may be established by receiving user input (not shown) prior to tasks 502 and 504.

As another alternative, certain steps of the sequence 500 (e.g. 502 and 504) may be performed by a dedicated high-accuracy pre-formatting machine at the time of manufacturing the tape media. In some applications, this may provide greater precision in pre-formatting as well as greater convenience for end users.

In still another embodiment (not shown), segments may be defined in groups as needed, instead of defining segments across the entire tape. In this embodiment, for example, task 502 (FIG. 5) may be initially performed to define segments-headers on a designated portion of tape, such as the first "track group" or "wrap half". Then, after the pre-formatted portion of tape is filled during a period of tape access (task 506), task 502 may be repeated to define a new group of additional segment-headers in a remaining track group or wrap half of the tape.

Pre-Formatting: Variable Partitioning

Layout

Figure 6:
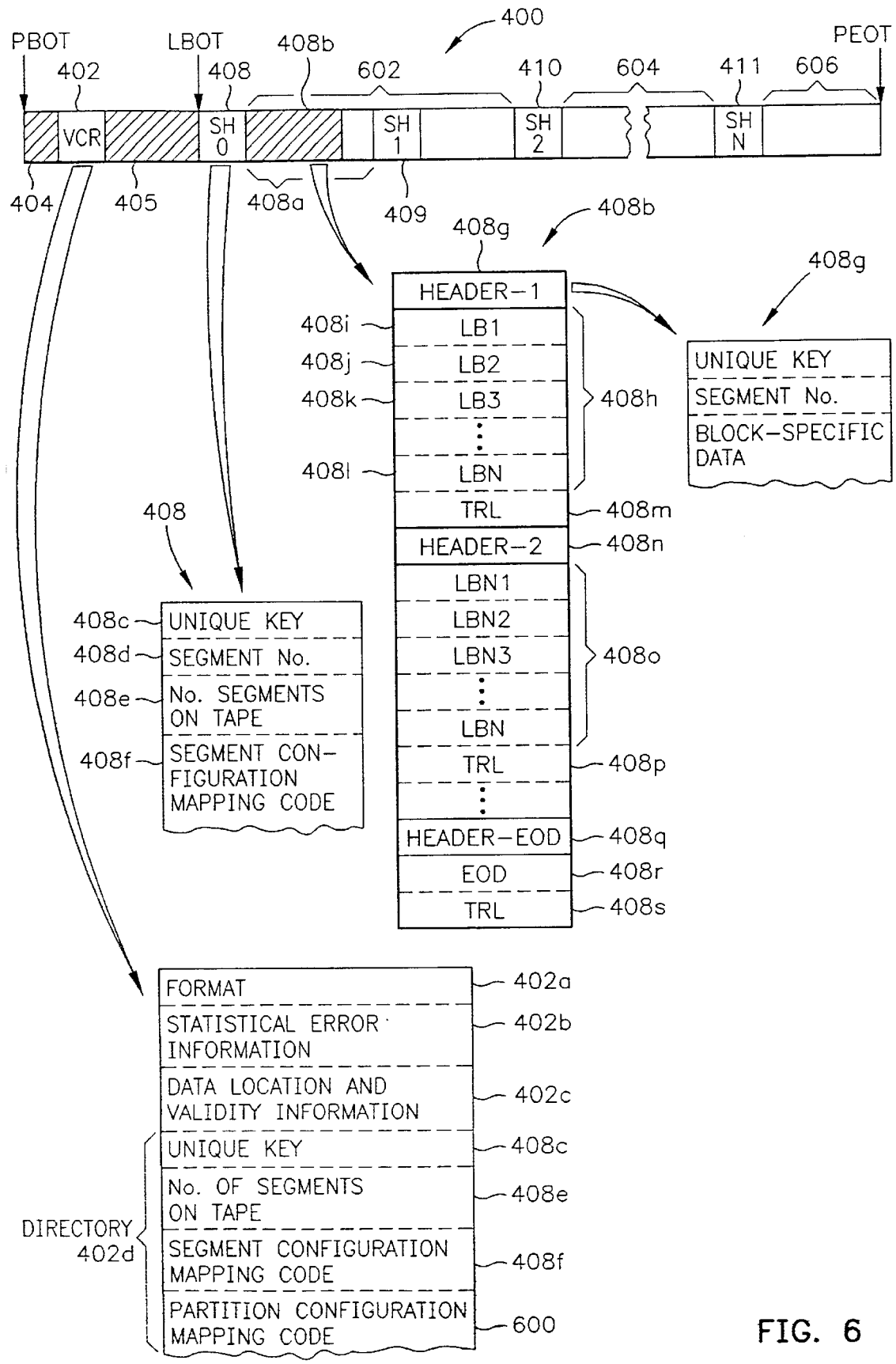
FIG. 6 is a block diagram depicting a pre-formatted tape exemplifying variable partitioning in accordance with the invention.

Broadly, variable partitioning involves the use of data storage partitions where each includes a user-selected number of segments, successively defined. Referring to FIG. 6, many features of variable partitioning are similar to fixed partitioning, described above in FIG. 4.

However, certain characteristics are modified to accommodate partitions whose sizes vary. For instance, in addition to the segment configuration mapping code 408f, the directory 402d also includes a partition configuration mapping code 600. As mentioned above, the segment configuration mapping code 408f comprises a code indicative of the configuration of segment pre-formatting applied to the tape 400. In contrast, the partition configuration mapping code 600 indicates the mapping between segments and partitions on the tape 400. In the illustrated example, three partitions 602–606 are defined: (1) the two segments between SH-0 through SH-2 constitute partition zero (602), (2) the multiple segments between SH-2 (410) and SH-N (411) constitute partition one (604), and (3) the single segment following SH-N constitutes partition two (606).

Variable Partitioning, Generally

For explanatory purposes, segments are considered to be sequentially ordered according to their respective distances from the tape's beginning, segments nearer the beginning being "earlier" ordered than segments relatively farther from the tape's beginning. Initially, the entire tape represents a single partition. When a set of device blocks or other user data is received for storage to the tape, the blocks are sequentially written to the minimum number of contiguous data storage segments required to store the blocks. Preferably, each set of device blocks is stored beginning in the earliest-ordered available segment available on the tape. Having written a set of device blocks to the minimum number of segments, these segments are defined as being a first partition; this is called "closing out" the partition. Then, all remaining (i.e., unoccupied) segments are defined as a second partition.

When more device blocks are received for storage to the tape, they are written to one or more segments at the beginning of the second partition. A minimum number of segments is preferably used to store the new device blocks. Having written these device blocks, the second partition is "closed out" by re-defining the second partition as being the newly occupied segments. All remaining (i.e., unoccupied) segments are defined as the third partition. Until the tape is filled, future data may be stored by creating additional partitions as described above, each partition having a variable size as appropriate to the amount of data stored therein.

Variable Partitioning Sequence

Figure 7:
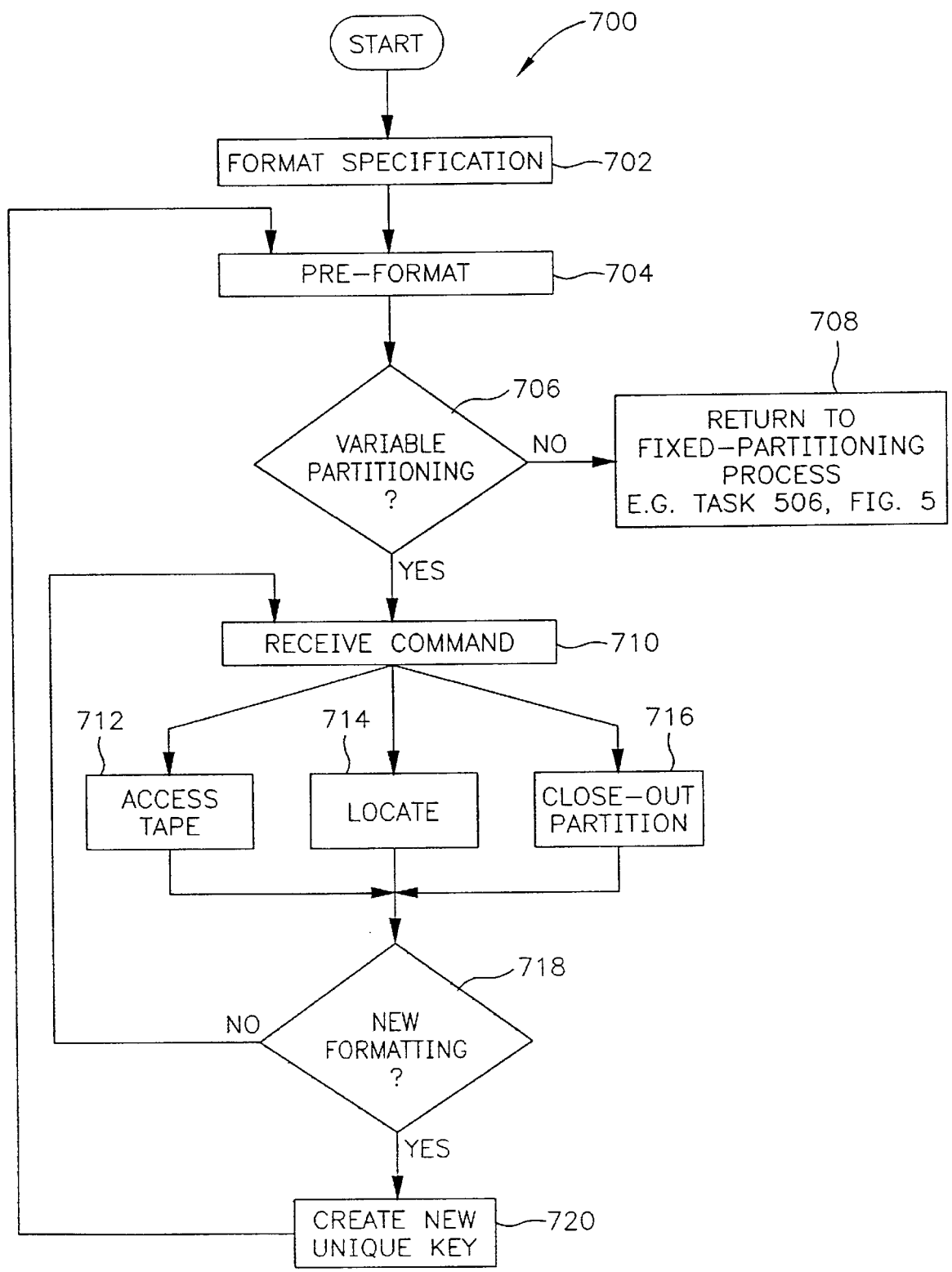
FIG. 7 is a flowchart showing a sequence for pre-formatting a tape utilizing variable partitioning in accordance with the invention.

FIG. 7 depicts an exemplary variable partitioning sequence pursuant to the invention, beginning in task 702. The sequence 700 may be performed by using a digital data processor such as the controller 204 or the host 202 to execute a program of machine-readable instructions of "C" or another language. In task 702 input is received specifying whether fixed or variable partitioning is to be used, and also specifying other parameters related to pre-formatting of the tape. These parameters may include, for example, the segment granularity. Then, in task 704 the tape drive is operated to define the segments on the tape. This is achieved as discussed above with reference FIGS. 4–5 including the sequence 500.

After task 704, query 706 asks whether variable partitioning was specified in task 702. If not, control returns to the process of creating fixed partitions, e.g. task 506 of FIG. 5. Otherwise, after query 706 a command is received in task 710. The command may be received from a user, such as a host, an application program, a human operator, or another device or process.

In response to the command of task 710, the drive may access the tape, locate data, or close out a partition. If the command specifies tape access, in task 712 the drive 223 performs various type access operations as required, such as read, write, and seek operations. If the command (task 710) specified a locate operation, in task 714 the drive 223 is directed to locate the desired data. If partition close-out was requested in task 710, task 716 performs a "close-out" operation, closing the current partition and creating a new partition from all remaining segments.

After any of tasks 712–716, query 718 asks whether a request has been received to pre-format the tape with new segment-headers. If not, control returns to task 710 to receive another command. Otherwise, if pre-formatting has been requested, task 720 generates a new unique key and returns control to task 704 to begin the pre-formatting process.

Continuous & Non-Continuous Data Storage

With "contiguous data storage", each partition includes adjacent data segments only. The foregoing example of FIG. 6 uses contiguous data storage. One advantage of the partitioning system of the invention, however, is the possibility of non-contiguous data storage. With non-contiguous data storage, the segments of each partition may or may not be next to each other.

Non-contiguous data storage broadly resembles contiguous data storage in many respects. For instance, the tape is partitioned using the sequence 700 (FIG. 7) as described above. However, after the tape has been partitioned as described above, a "free pool" (not shown) is maintained listing all segments not assigned to a partition. Then, each time task 710 is performed, additional "de-allocate" and "allocate" commands are also recognized. The de-allocate command removes a specified segment from a partition, donating it to the free pool. The allocate command removes a specified segment from the free pool, assigning it to a specified partition regardless of the specified segment's position on the tape.

The non-contiguous data storage sequence may also include a number of different routines (not shown) for optimizing allocation, de-fragmentation, etc.

As a further enhancement, another embodiment of the invention provides an increase in data storage capacity by selectively writing over certain segment-headers. In particular, when multi-segment partitions have been defined, data may be written over all but the initial segment-headers in a partition. This approach to expanding effective data storage capacity is especially applicable to non-contiguous data storage in the context of variable or fixed partitioning, although ordinarily skilled artisans (having the benefit of this disclosure) will recognize that other applications exist.

Padding

Another embodiment of the invention is "automated padding", which is applicable to variable partitioning with either contiguous or non-contiguous data storage. With automated padding, one or more empty data storage segments are added to each partition when that partition is closed out. The number of additional segments may be selected by a user in response to characteristics of the data in that partition. To temporarily disable automated padding, the user may select "zero" as the number of additional segments, for example. In an alternative embodiment, the number of additional segments may be automatically selected according to a default value, specified in advance by the user. This default value may set to zero, if desired to disable automated padding.

Automated padding is especially useful in support of update-in-place operations. In particular, updated data often occupies more space than the original data, even if the updated data contains the same number of bytes as the original data. This condition can occur where, for example, the updated data is enlarged due to variations caused by error checking algorithms, etc. With automated padding, however, extra space may be reserved on tape for possibly larger sets of replacement data blocks that may be larger than the original data blocks being replaced.

Flexible-Capacity Scaling

In General

As mentioned above, many basic tape storage systems store data in serpentine fashion, and some more advanced systems use fixed-capacity scaling. The inventors have improved these techniques by developing "flexible-capacity scaling," described as follows. With flexible-capacity scaling, data is stored on a multi-track tape using a hybrid serpentine pattern. Data is bi-directionally stored in a continuous configuration of multiple adjacent stacked serpentine patterns. The configuration is continuous in that sequential access of all device blocks is possible without advancing the tape medium to skip over any regions intervening between adjacent ones of the ordered device blocks.

Figure 8:
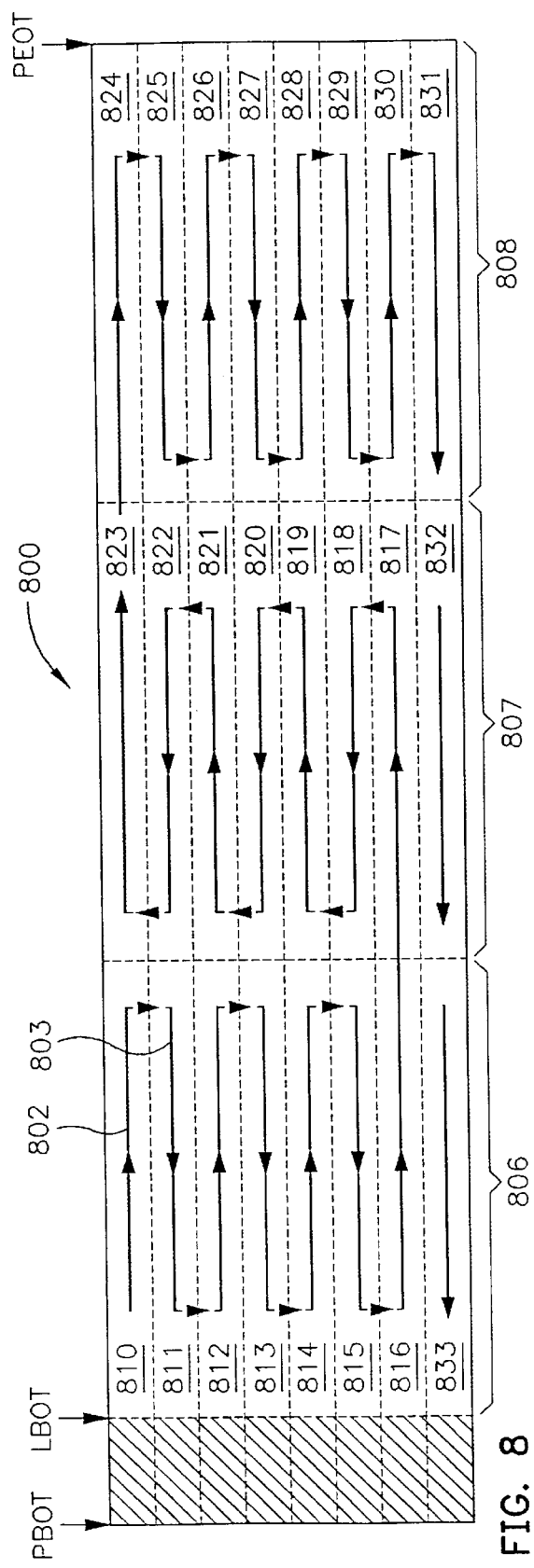
FIG. 8 is a diagram of a multi-track tape using one configuration of flexible-capacity scaling in accordance with the invention.

More particularly, FIG. 8 depicts a multi-track tape 800 illustrating an example of flexible-capacity scaling. The tape 800 contains bi-directionally stored data; this is indicated, for example, by the directions shown by the arrows 802–803. The illustrated data storage pattern employs three adjacent stacked serpentine patterns 806–808, although a greater or lesser number of multiple stacked serpentine patterns may be used pursuant to the invention. In each serpentine pattern 806–808, the data path winds back and forth across multiple tracks within prescribed boundaries of the tape.

This configuration is most advantageous when the items of data are ordered in some fashion, that is, there is some significance to the order in which the items of data are assembled. For example, items of data may correspond to measurements made at successively increasing time periods, alphabetically arranged names, textual summaries numerically arranged according to docket numbers, etc. The data items are preferably stored in a sequence corresponding to this order. For example, using the example of FIG. 8, the data items 810–833 represent data items of sequentially increasing order. If the items of data are sequentially ordered, data locate operations will advantageously involve a minimum of tape movement by the drive. These operations offer even more drastic improvements in data locate efficiency in cases where gaps exist between the data items. This is because items of data adjacent in sequential order are stored in adjacent locations on tape. For instance, items 810 and 811 are stored at adjacent locations on the tape 800.

Moreover, as shown by the directional arrows, including the arrows 802–803, the data storage pattern is continuous; data blocks that are adjacent in sequential ordering are always adjacent in the data path. And, due to the pattern's path, sequential access of all data stored on the tape is possible without advancing the tape medium to skip over any regions intervening between adjacent ones of the ordered device blocks. In other words, little or no tape movement is needed to progress from the end of one data item to the beginning of the next data item. For example, items 816 and 817 are adjacent, as are items 823 and 824. The path along items 829, 830, 831, 832, and 833 is likewise continuous. Accessing data with flexible-scaling thus requires a modicum of tape movement.

As shown in FIG. 8, flexible-capacity scaling can be employed even when the data completely fills the tape, unlike fixed-capacity scaling. In this situation, flexible-capacity scaling provides rapid access of sequential data because sequentially proximate items of data are stored in proximate locations.

Figure 9:
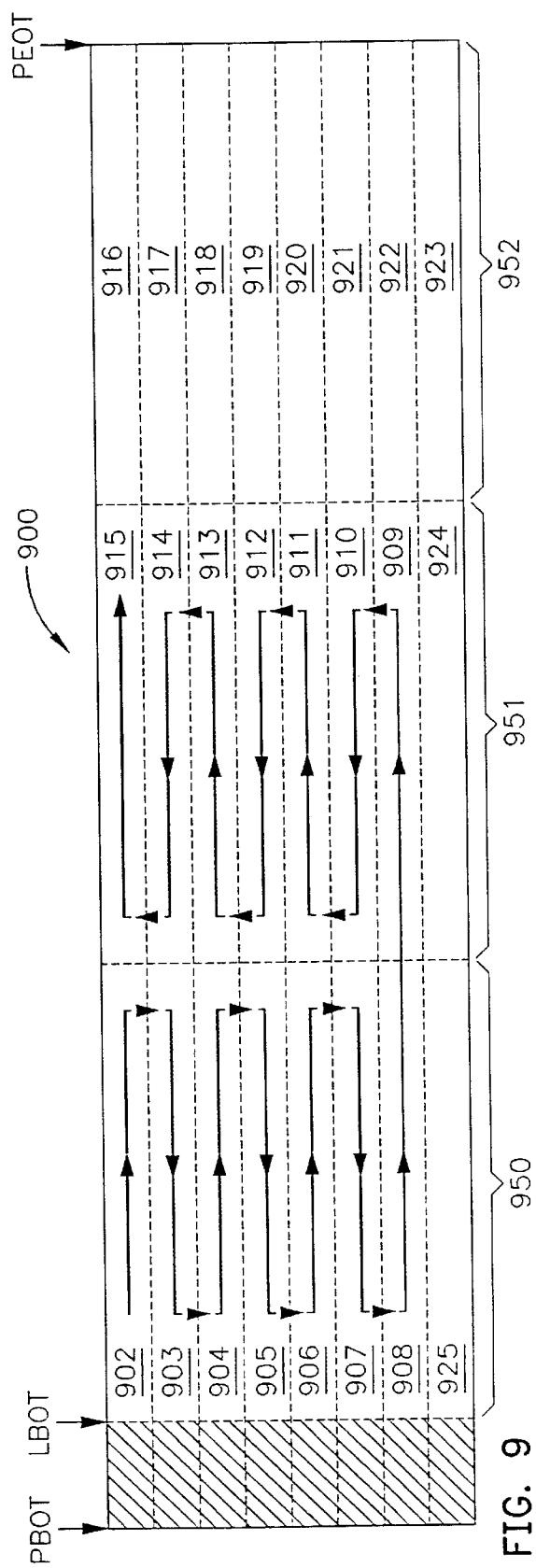
FIG. 9 is a diagram of a multi-track tape using another configuration flexible-capacity scaling in accordance with the invention.

In addition, flexible-capacity scaling can still be used when data does not completely fill the tape, like fixed-capacity scaling. FIG. 9 illustrates an example, where the data items 902–915 occupy two-thirds of a length of tape 900. Here, the data path includes two stacked serpentine patterns 950–951. The remaining section of tape 952 is empty. After the items 902–915 are stored on tape, however, additional items of data may be stored according to a data path progressing (as needed) through locations 916–925, respectively.

FIGS. 8–9 demonstrate that a continuous data pattern can be created with even as well as odd numbers of serpentine patterns. The configurations of FIGS. 8–9 are merely provided as examples, however. Other variations of these data storage paths may be used to provide continuous access to ordered data stored in multiple stacked serpentine patterns. For example, the serpentine pattern may start at mid-tape (not shown) instead of the tape's beginning (as illustrated), to support mid-tape loading cassettes.

Flexible-Capacity Scaling With Partitioning

An enhanced embodiment of flexible capacity scaling may be implemented to provide partitioning. In one possible arrangement, each swath in a serpentine stack may be designated as one segment. Segments in this arrangement may be successively numbered in proportion to the advancement of the data path, e.g. segments 0–13 corresponding to data items 902–915 (FIG. 9), or segments 0–23 corresponding to data items 810–833 (FIG. 8).

Alternatively, a greater or lesser number of partitions may be included in each serpentine swath. For example, each swath may include two or three partitions. To illustrate a specific example, a tape may be defined with 5/2 segments where direction reversals occur after every fourth segment; in this example, each swath includes form partitions. Increasing the number of segments in each serpentine swath may be advantageous in some applications, such as those applications having a fine segment granularity; in these cases, having longer swaths helps to maintain desirable read/write performance, which may otherwise be restricted by a large number of reversals in tape path direction. Furthermore, partitioning with flexible-capacity scaling may be fixed or variable, employing the teachings provided above.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for pre-formatting magnetic tape media, comprising the steps of:
   defining a first plurality of data storage segments on a magnetic tape medium by writing a first plurality of segment-headers to the tape medium, said writing being performed free from any interleaved writing of user data to the tape medium, adjacent ones of said first plurality of segment-headers being evenly spaced apart by a first predetermined interval, each one of said first plurality of segment-headers containing a first predetermined key common to all of said first plurality of segment-headers; and
   storing the first predetermined key in a key index to identify the first plurality of segments as being most recent.

2. The method of claim 1, further comprising a step of, prior to the writing step, receiving a granularity input specifying the first predetermined interval.

3. The method of claim 1, further comprising the steps of:
   defining a second plurality of data storage segments on the tape medium by writing a second plurality of segment-headers to the tape medium said writing being performed free from any interleaved writing of user data to the tape medium, adjacent ones of said second plurality of segment-headers being evenly spaced apart by a second predetermined interval, each one of said second plurality of segment-headers containing a second predetermined key common to all of said second plurality of segment-headers, said second predetermined key being different than the first predetermined key; and
   storing the second predetermined key in a key index to identify the second plurality of segments as being most recent.

4. The method of claim 3, the second predetermined interval being different than the first predetermined interval.

5. The method of claim 4, further comprising a step of, prior to the step of writing the second plurality of segment-headers, writing multiple blocks of user data into selected ones of the first plurality of segments.

6. The method of claim 5, further comprising a step of, after the step of writing the second plurality of segment-headers, writing multiple blocks of user data into selected ones of the second plurality of segments irrespective of any blocks of user data previously written into the first plurality of segments.

7. The method of claim 1, further comprising the step of defining each segment as an independently addressable partition.

8. The method of claim 1, further comprising the step of defining a first predetermined number of independently addressable partitions, each of said partitions corresponding to a different group of at least one data storage segment.

9. The method of claim 8, at least one of the partitions corresponding to multiple data storage segments.

10. The method of claim 8, at least one of the partitions corresponding to a single data storage segment.

11. The method of claim 8, wherein a first one of the partitions includes an initial data storage segment marked by an initial segment-header and at least one subsequent data storage segment marked by a corresponding number of subsequent segment-headers, said method further comprising the step of enhancing data capacity utilization in the first partition by writing user data into the initial and subsequent segments and over the subsequent segment-headers while avoiding any writing over the initial segment-header.

12. The method of claim 1, the key index being contained on the tape medium.

13. The method of claim 1, further comprising:
   writing multiple blocks of user data into a corresponding number of the first plurality of segments.

14. The method of claim 1, further comprising:
   writing multiple blocks of user data into a corresponding number of the first plurality of segments irrespective of any previous existing data or header information residing in the first plurality of segments.

15. The method of claim 1, the defining and storing steps writing the segment-headers and storing the predetermined key on the tape medium in replacement of abandoned data and header information preexisting on the tape medium.

16. A method for formatting magnetic tape media, comprising the steps of:
   defining a first plurality of data storage segments on a magnetic tape medium by writing a first plurality of segment-headers to the tape medium, said writing being performed free from any interleaved writing of user data to the tape medium, adjacent ones of said first plurality of segment-headers being evenly spaced apart by a first predetermined interval, each one of said first plurality of segment-headers containing a first predetermined key common to all of said first plurality of segment-headers;

wherein the segments are sequentially ordered according to a predetermined scheme;

storing the first predetermined key in a key index to identify the first plurality of segments as being most recent; and establishing as a first partition at least one segment and establishing as a second data partition all remaining segments.

17. The method of claim 16, further comprising the steps of:

re-establishing the second partition to exclude at least one particular segment; and establishing as a third partition all segments excluded from the re-defined second partition.

18. The method of claim 16, further comprising the steps of:

maintaining a free pool of unoccupied storage segments;

enlarging an existing partition by allocating a segment from the free pool to the existing partition; and reducing an existing partition by allocating a segment to the free pool from the existing partition.

19. The method of claim 18, wherein segments allocated to existing partitions are located adjacent to segments of said existing partitions.

20. A method for formatting magnetic tape media, comprising the steps of:

defining a first plurality of data storage segments on a magnetic tape medium by writing a first plurality of segment-headers to the tape medium, said writing being performed free from any interleaved writing of user data to the tape medium, adjacent ones of said first plurality of segment-headers being evenly spaced apart by a first predetermined interval, each one of said first plurality of segment-headers containing a first predetermined key common to all of said first plurality of segment-headers;

wherein the segments are sequentially ordered according to a predetermined scheme;

storing the first predetermined key in a key index to identify the first plurality of segments as being most recent;

receiving a first set of device blocks to be written;

sequentially writing the first set of device blocks to a minimum number of at least one segment needed to contain the first set of device blocks; and establishing as a first partition said at least one segment, and establishing as a second data partition all subsequently ordered segments.

21. The method of claim 20, further comprising the steps of:

receiving a second set of device blocks to be written;

sequentially writing the second set of device blocks to a minimum number of at least one lowest ordered segment in the second partition needed to contain the second set of device blocks; and establishing as the second partition said at least one segment needed to contain the second set of device blocks, and establishing as a third partition all subsequently ordered segments.

22. The method of claim 21, the establishing step comprising the steps of:

establishing as a first partition said at least one segment along with a predetermined number of additional segments for padding; and establishing as a second data partition all subsequently ordered segments.

23. The method of claim 22, further comprising the steps of receiving an input of the predetermined number of additional segments from a user.

24. The method of claim 22, the predetermined number of additional segments being pre-established by a default value.

25. The method of claim 22, the predetermined number of additional segments being zero.

* * * * *